United States Patent
Ito

(10) Patent No.: US 6,245,878 B1
(45) Date of Patent: Jun. 12, 2001

(54) PROCESS FOR PRODUCING POLYCARBONATE

(75) Inventor: Mitsunori Ito, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/508,508

(22) PCT Filed: Oct. 30, 1998

(86) PCT No.: PCT/JP98/04941

§ 371 Date: Mar. 23, 2000

§ 102(e) Date: Mar. 23, 2000

(87) PCT Pub. No.: WO99/26995

PCT Pub. Date: Jun. 3, 1999

(30) Foreign Application Priority Data

Nov. 26, 1997 (JP) .................................................. 9-324039

(51) Int. Cl.⁷ ...................................................... C08G 64/00
(52) U.S. Cl. ............................................. 528/196; 528/198
(58) Field of Search ...................................... 528/196, 198

(56) References Cited

FOREIGN PATENT DOCUMENTS

06271659 * 9/1994 (JP) .
8-208823 * 8/1996 (JP) .

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

Provided is a process for producing a polycarbonate, which comprises preparing a polycarbonate prepolymer through prepolymerization followed by polymerizing the prepolymer in a solid phase in the presence of a phosphorus-containing basic compound serving as a catalyst in an atmosphere of a poor solvent gas. Preferably, the poor solvent is one in which the polycarbonate has a solubility of at most 0.1% by weight, more preferably, a linear aliphatic or cycloaliphatic hydrocarbon having from 5 to 18 carbon atoms. The process is efficient in producing high-quality polycarbonates having a high molecular weight.

2 Claims, No Drawings

PROCESS FOR PRODUCING POLYCARBONATE

TECHNICAL FIELD

The present invention relates to a process for producing polycarbonates. More precisely, it relates to an efficient process for producing high-quality polycarbonates having a high molecular weight.

BACKGROUND ART

For producing polycarbonates, known are a method of directly reacting an aromatic dihydroxy compound such as bisphenol A or the like with phosgene (interfacial polycondensation), and a method of transesterifying an aromatic dihydroxy compound such as bisphenol A or the like with a dicarbonate such as diphenyl carbonate or the like in a melt or solid phase (melt polymerization, solid-phase polymerization).

The interfacial polycondensation method is problematic in that it requires toxic phosgene and the chlorine-containing side products formed corrode the apparatus used. On the other hand, the melt polymerization method in which the monomers are reacted for a long period of time at high temperatures generally falling between 280° C. and 310° C. is also problematic in that the polycarbonates produced are inevitably colored and could not have a high molecular weight.

To solve the problems with the melt polymerization method, one proposal was made in Japanese Patent Laid-Open No. 208823/1996. The method proposed comprises polymerizing the prepolymer for the intended polycarbonate in a poor solvent gas stream in the presence of a nitrogen-containing organic basic catalyst. In that method, the polycarbonate produced could have good quality but could not have a sufficiently increased molecular weight. The method could not still solve the outstanding problem of how to produce high-molecular-weight polycarbonates.

To produce high-molecular-weight polycarbonates, another method was proposed, which comprises preparing a polycarbonate prepolymer followed by polymerizing it in a solid phase and in which the prepolymer being polymerized is in a swollen solid phase in a swelling solvent gas stream (Japanese Patent Laid-Open No. 235368/1997). In that method, however, polycarbonates having a sufficiently increased molecular weight could not still be obtained. What is more, the method is problematic in that, when the polymerization temperature is further elevated so as to increase the molecular weight of the polycarbonate being produced, then the polycarbonate produced dissolves in the swelling solvent used.

In the laid-open patent specification, also proposed was solid-phase polymerization of the prepolymer in an atmosphere of nitrogen gas or lower hydrocarbon gas. However, this is not favorable since the efficiency of trapping the phenolic side products formed during polymerization is poor and the side products are difficult to separate, remove and recover.

The object of the present invention is to solve the problems with the conventional polycarbonate production methods as above and to provide an efficient process for producing high-quality polycarbonates having a high molecular weight.

DISCLOSURE OF THE INVENTION

We, the present inventors have assiduously studied so as to attain the object as above, and, as a result, have found that, when a polycarbonate prepolymer (this may be hereinafter simply referred to as "prepolymer") is prepared and polymerized in a solid phase in the presence of a specific catalyst and in a specific solvent atmosphere, then the object can be attained.

The present invention has been accomplished on the basis of this finding.

Specifically, the invention provides the following:

(1) A process for producing a polycarbonate, which comprises preparing a polycarbonate prepolymer through prepolymerization followed by polymerizing the prepolymer in a solid phase in the presence of a phosphorus-containing basic compound serving as a catalyst in an atmosphere of a poor solvent gas.

(2) The process for producing a polycarbonate of above (1), wherein the poor solvent is one in which the polycarbonate has a solubility of at most 0.1% by weight.

(3) The process for producing a polycarbonate of above (1), wherein the poor solvent is a linear aliphatic or cycloaliphatic hydrocarbon having from 5 to 18 carbon atoms.

(4) The process for producing a polycarbonate of any one of above (1) to (3), wherein the phosphorus-containing basic compound is a quaternary phosphonium salt.

BEST MODES OF CARRYING OUT THE INVENTION

The starting materials for producing polycarbonates in the invention are not specifically defined. Preferably used are (A) dihydroxy compounds and (B) dicarbonates or phosgene, and optionally used are terminal-stopping agents, chain-branching agents, etc. These starting materials are prepolymerized to give prepolymers, which are then polymerized in a solid phase into polycarbonates.

The catalyst in prepolymerization is not specifically defined, but preferred is a nitrogen-containing organic basic compound. In the solid-phase polymerization, used is a phosphorus-containing basic compound, preferably a quaternary phosphonium salt.

(1) Starting Materials:

Dihydroxy compounds for component (A):

For example, aromatic dihydroxy compounds and aliphatic dihydroxy compounds are mentioned, and at least one selected from them is used in the invention.

As examples of the aromatic dihydroxy compounds usable as the component (A), mentioned are those of a general formula (1):

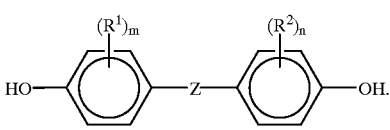

(1)

In formula (1), $R^1$ and $R^2$ each represent a halogen atom such as a fluorine, chlorine, bromine or iodine atom, or an alkyl group having from 1 to 8 carbon atoms such as a methyl, ethyl, n-propyl, isopropyl, n-butyl, isobutyl, sec-butyl, t-butyl, pentyl, hexyl, cyclohexyl, heptyl or octyl group. $R^1$ and $R^2$ may be the same or different ones. Plural $R^1$'s, if any, may be the same or different ones; and plural $R^2$'s, if any, may be the same or different ones. m and n each represent an integer of from 0 to 4. Z represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, or a bond of —S—, —SO—, —SO$_2$—, —O— or —CO—, or a bond of the following formula (2) or (3):

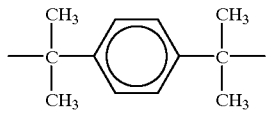
(2)

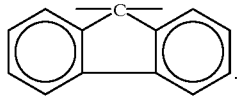
(3)

The alkylene group having from 1 to 8 carbon atoms and the alkylidene group having from 2 to 8 carbon atoms include, for example, methylene, ethylene, propylene, butylene, pentylene, hexylene, ethylidene and isopropylidene groups. The cycloalkylene group having from 5 to 15 carbon atoms and the cycloalkylidene group having from 5 to 15 carbon atoms include, for example, cyclopentylene, cyclohexylene, cyclopentylidene and cyclohexylidene groups.

In preferred embodiments of the invention, one or more of the compounds mentioned above are suitably selected and used as the dihydroxy compounds for the component (A). Of those compounds noted above, preferred is an aromatic dihydroxy compound, bisphenol A.

In addition, diesters of dihydroxy compounds, dicarbonates of dihydroxy compounds, and monocarbonates of dihydroxy compounds are also usable in the invention.

Compounds for component (B):

[1] Dicarbonates:

Various types of dicarbonates are usable in the invention. For example, used is at least one selected from diaryl carbonates, dialkyl carbonates and alkylaryl carbonates.

The diaryl carbonates usable for the component (B) include compounds of a general formula (4):

(4)

wherein Ar$^1$ and Ar$^2$ each represent an aryl group, and these may be the same or different ones;

and compounds of a general formula (5):

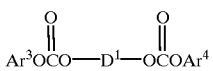
(5)

wherein Ar$^3$ and Ar$^4$ each represent an aryl group, and these may be the same or different ones; and D$^1$ represents a residue of an aromatic dihydroxy compound of those of formula (1) noted above from which two hydroxyl groups are removed.

The dialkyl carbonates include compounds of a general formula (6):

(6)

wherein R$^3$ and R$^4$ each represent an alkyl group having from 1 to 6 carbon atoms or a cycloalkyl group having from 4 to 7 carbon atoms, and these may be the same or different ones;

and compounds of a general formula (7):

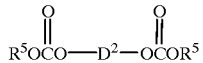
(7)

wherein R$^5$ and R$^6$ each represent an alkyl group having from 1 to 6 carbon atoms or a cycloalkyl group having from 4 to 7 carbon atoms, and these may be the same or different ones; and D$^2$ represents a residue of an aromatic dihydroxy compound of those noted above from which two hydroxyl groups are removed.

The alkylaryl carbonates include compounds of a general formula (8):

(8)

wherein Ar$^5$ represents an aryl group; and R$^7$ represents an alkyl group having from 1 to 6 carbon atoms or a cycloalkyl group having 4 carbon atoms;

and compounds of a general formula (9):

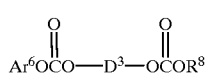
(9)

wherein Ar$^6$ represents an aryl group; R$^8$ represents an alkyl group having from 1 to 6 carbon atoms or a cycloalkyl group having from 4 to 7 carbon atoms; and D$^3$ represents a residue of an aromatic dihydroxy compound of those noted above from which two hydroxyl groups are removed.

One or more of the compounds mentioned above are suitably selected and used as the dicarbonates for the component (B) Of those compounds noted above, preferred is diphenyl carbonate.

[2] Phosgene:

Phosgene may be used for the component (B). Phosgene, if used, requires a suitable amount of a monohydroxy compound.

(2) Prepolymerization to Prepare Prepolymers:

The starting materials, dihydroxy compound for the component (A), and dicarbonate or phosgene for the component (B) are prepolymerized optionally along with a terminal-stopping agent or a chain-branching agent to prepare prepolymers. In this step, preferably used is a nitrogen-containing organic basic compound serving as a catalyst.

Preferred methods and conditions for prepolymerization are described concretely.

[1] Methods for Prepolymerization:

(i) A dihydroxydiaryl compound may be reacted with a diaryl carbonate under heat to give a prepolymer while the aromatic monohydroxy compound resulting from the reaction is removed. The viscosity-average molecular weight of the prepolymer to be prepared in this prepolymerization step preferably falls between 2000 and 20000. It is desirable that the prepolymerization is effected in melt.

The ratio of the diaryl carbonate to the dihydroxydiaryl compound to be reacted (that is, to be fed into the reactor) varies, depending on the type of the compounds, the reaction temperature and also other reaction conditions, but may fall generally between 0.9 and 2.5.

The reaction temperature and the reaction time also vary, depending on the type and the amount of the starting compounds and the catalyst used, the intended degree of prepolymerization of the prepolymer to be prepared, and other reaction conditions. Preferably, the reaction temperature falls between 50 and 350° C., and the reaction time falls between 1 minute and 100 hours. In order that the prepolymer prepared is not colored, it is desirable that the temperature for the prepolymerization is as low as possible and the time for it is as short as possible. The pressure during the reaction preferably falls between 1 Torr and 5 kg/cm²G.

The terminal ratio of the prepolymer to be prepared in this step preferably falls between 50/50 and 99/1 in terms of the ratio of phenyl carbonate terminal/hydroxyl terminal.

(ii) An aromatic dihydroxy compound may be reacted with phosgene to give a prepolymer in any known manner in the presence of a molecular weight-controlling agent, an acid-binding agent and a solvent such as those mentioned above.

[2] Catalysts for Prepolymerization:

Catalysts for the prepolymerization are not specifically defined, but preferred are nitrogen-containing organic basic compounds which will be described hereunder. In the prepolymerization step, it is desirable that the catalyst of a nitrogen-containing organic basic compound is used in an amount of from $10^{-8}$ to $10^{-2}$ mols, more preferably from $10^{-7}$ to $10^{-3}$ mols, relative to one mol of the starting dihydroxy compound of the component (A). If the amount of the nitrogen-containing organic basic compound used is smaller than $10^{-8}$ mols, the catalytic activity in the initial stage of the reaction will be low. However, if larger than $10^{-2}$ mols, the cost of the catalyst unfavorably increases. As the case may be, in this stage, one or more of the polymerization catalysts to be mentioned hereinunder may be used either singly or as combined.

Various types of nitrogen-containing organic basic compounds are employable herein with no specific limitation. For example, employable are aliphatic tertiary amine compounds such as trimethylamine, triethylamine, tripropylamine, tributylamine, tripentylamine, trihexylamine, dimethylbenzylamine, etc.; aromatic tertiary amine compounds such as triphenylamine, etc.; and nitrogen-containing heterocyclic compounds such as N,N-dimethyl-4-aminopyridine, 4-diethylaminopyridine, 4-pyrrolidinopyridine, 4-aminopyridine, 2-aminopyridine, 2-hydroxypyridine, 4-hydroxypyridine, 2-methoxypyridine, 4-methoxypyridine, imidazole, 2-methylimidazole, 4-methylimidazole, 2-dimethylimidazole, 2-methoxyimidazole, 2-mercaptoimidazole, aminoquinoline, diazabicyclooctane (DABCO), etc. In addition, further employable are quaternary ammonium salts of a general formula (10):

$$(NR^9{}_4)^+(X^1)^- \tag{10}$$

In formula (10), $R^9$ represents an organic group, for example, an alkyl or cycloalkyl group such as a methyl, ethyl, propyl, butyl, pentyl, hexyl, octyl or cyclohexyl group, an aryl group such as a phenyl, tolyl, naphthyl or biphenyl group, or an arylalkyl group such as a benzyl group. Four $R^9$'s may be the same or different ones; and two of them may be bonded to each other to form a cyclic structure. $X^1$ represents a halogen atom, a hydroxyl group, or $BR_4$, in which R represents a hydrogen atom, or a hydrocarbon group such as an alkyl or aryl group, and four R's may be the same or different ones.

Examples of the quaternary ammonium salts include, for example, ammonium hydroxides having alkyl, aryl and/or alaryl groups, such as tetramethylammonium hydroxide, tetraethylammonium hydroxide, tetrabutylammonium hydroxide, trimethylbenzylammonium hydroxide, etc.; and basic salts such as tetramethylammonium borohydride, tetrabutylammonium borohydride, tetrabutylammonium tetraphenyl borate, tetramethylammonium tetraphenyl borate, etc.

Of the nitrogen-containing organic basic compounds noted above, preferred are the quaternary ammonium salts of formula (I), concretely such as tetramethylammonium hydroxide, tetrabutylammonium hydroxide, tetramethylammonium borohydride, and tetrabutylammonium borohydride, since they have high catalytic activity and since they are easily pyrolyzed and hardly remain in the polymers produced. Of those, especially preferred is tetramethylammonium hydroxide.

One or more of these nitrogen-containing organic basic compounds are employable herein either singly or as combined.

It is desirable that the amount of metallic impurities in the nitrogen-containing organic basic compounds for use in the invention is as small as possible. Especially preferably, the amount of alkali metal and alkaline earth metal compounds in those compounds is not larger than 50 ppm.

[3] Crystallization of Prepolymers:

The prepolymers thus prepared herein are preferably crystallized, for which the method is not specifically defined. Preferred is solvent treatment for crystallization or crystallization under heat.

(3) Polymerization to Produce Polycarbonates:

In the invention, the polycarbonate prepolymer prepared is then polymerized in a solid phase in the presence of a phosphorus-containing basic compound serving as a polymerization catalyst, preferably a quaternary phosphonium salt.

[1] Catalysts for Polymerization:

(a) Phosphorus-containing Basic Compounds:

One or more phosphorus-containing basic compounds are usable either singly or as combined.

(i) Tri-valent Phosphorus Compounds:

Various tri-valent phosphorus compounds are usable herein with no specific limitation. For example, used are compounds of general formulae (11) and (12):

$$R^9{}_3P \tag{11}$$

$$(R^9O)_3P \tag{12}.$$

In formulae (11) and (12), $R^9$ represents a hydrogen atom or an organic group. The organic group includes, for example, an alkyl or cycloalkyl group such as a methyl, ethyl, propyl, butyl, pentyl, hexyl, octyl or cyclohexyl group; an aryl group such as a phenyl, tolyl, naphthyl or biphenyl group; and an arylalkyl group such as a benzyl group. Three $R^9$'s may be the same or different ones, or two of them may be bonded to each other to form a cyclic structure.

Of those tri-valent phosphorus compounds, the compounds of formula (11) include, for example, alkylphosphines such as ethylphosphine, diethylphosphine, propylphosphine, etc.; and arylphosphines or arylalkylphosphines such as phenylphosphine, diphenylphosphine, phenylmethylphosphine, etc. The compounds of formula (12) include, for example, alkyl phosphites such as dimethyl phosphite, trimethyl phosphite, diethyl phosphite, triethyl phosphite, dibutyl phosphite, etc.; aryl phosphites such as diphenyl phosphite, triphenyl phosphite, tris(ethylphenyl) phosphite, etc.; and arylalkyl phosphites such as diphenyloctyl phosphite, diphenyldecyl phosphite, phenyldidecyl phosphite, etc.

(ii) Quaternary Phosphonium Salts:

Various quaternary phosphonium salts are usable herein with no specific limitation. For example, preferably used are compounds of general formulae (13) and (14):

$(PR^{10}{}_4)^+(X^1)^-$ (13)

$(PR^{10}{}_4)_2{}^+(Y^1)^{2-}$ (14).

In formulae (13) and (14), $R^{10}$ represents an organic group. The organic group includes, for example, an alkyl or cycloalkyl group such as a methyl, ethyl, propyl, butyl, pentyl, hexyl, octyl orcyclohexyl group; an aryl group such as a phenyl, tolyl, naphthyl or biphenyl group; and an arylalkyl group such as a benzyl group. Four $R^{10}$'s may be the same or different ones, or two of them may be bonded to each other to form a cyclic structure. $X^1$ represents a group capable of forming a mono-valent anion, such as a halogen atom, a hydroxyl group, an alkyloxy group, an aryloxy group, R'COO, $HCO_3$, $(R'O)_2P(=O)O$, $BR''_4$ or the like. In those, R' represents a hydrocarbon group such as an alkyl group, an aryl group or the like, and two (R'O) s may be the same or different ones. R" represents a hydrogen atom, or a hydrocarbon group such as an alkyl group, an aryl group or the like, and four R"s may be the same or different ones. $Y^1$ represents a group capable of forming a di-valent anion, such as $CO_3$ or the like.

The quaternary phosphonium salts include, for example, tetra(aryl or alkyl)phosphonium hydroxides such as tetraphenyl phosphonium hydroxide, tetranaphthylphosphonium hydroxide, tetra(chlorophenyl)phosphonium hydroxide, tetra (biphenyl)phosphonium hydroxide, tetratolylphosphonium hydroxide, tetramethylphosphonium hydroxide, tetraethylphosphonium hydroxide, tetrabutylphosphonium hydroxide, etc.; as well as tetramethylphosphonium tetraphenyl borate, tetraphenylphosphonium bromide, tetraphenylphosphonium phenolate, tetraphenylphosphonium tetraphenyl borate, methyltriphenylphosphonium tetraphenyl borate, benzyltriphenylphosphonium tetraphenyl borate, biphenyltriphenylphosphonium tetraphenyl borate, tetratolylphosphonium tetraphenyl borate, tetraphenylphosphonium phenolate, tetra(p-t-butylphenyl) phosphonium diphenyl phosphate, triphenylbutylphosphonium phenolate, triphenylbutylphosphonium tetraphenyl borate, etc.

Except the compounds of formulae (13) and (14) noted above, also usable herein are bis-tetraphenylphosphonium salt of 2,2-bis(4-hydroxyphenyl)propane, and ethylenebis(triphenylphosphonium) dibromide, trimethylenebis(triphenylphosphonium)-bis(tetraphenyl borate), etc.

Of the quaternary phosphonium salts noted above, preferred are those having alkyl groups, since they have high catalytic activity and since they are easily pyrolyzed and hardly remain in the polymers produced. For example, preferably used are tetraphenylphosphonium tetraphenyl borate, tetrabutylphosphonium tetraphenyl borate, tetraethylphosphonium tetraphenyl borate, etc.

Further usable herein are quaternary phosphonium salts having aryl and/or branched alkyl groups, for example, tetraphenylphosphonium hydroxide, tetranaphthylphosphonium hydroxide, tetra(chlorophenyl)phosphonium hydroxide, etc.; mono(aryl or alkyl)triphenylphosphonium hydroxides such as methyltriphenylphosphonium hydroxide, ethyltriphenylphosphonium hydroxide, propyltriphenylphosphonium hydroxide, etc.; mono(aryl) trialkylphosphonium hydroxides such as phenyltrimethylphosphonium hydroxide, biphenyltrimethylphosphonium hydroxide, etc.; diaryldialkylphosphonium hydroxides such as dimethyldiphenylphosphonium hydroxide, etc.; tetraarylphosphonium tetraphenyl borates such as tetraphenylphosphonium tetraphenyl borate, tetranaphthylphosphonium tetraphenyl borate, etc.; mono (aryl or alkyl) triphenylphosphonium tetraphenyl borates such as methyltriphenylphosphonium tetraphenyl borate, ethyltriphenylphosphonium tetraphenyl borate, etc.; monoaryltrialkylphosphonium tetraphenyl borates such as phenyltrimethylphosphonium tetraphenyl borate, biphenyltrimethylphosphonium tetraphenyl borate, etc.; diaryldialkylphosphonium tetraphenyl borates such as dimethyldiphenylphosphonium tetraphenyl borate, diethyldiphenylphosphonium tetraphenyl borate, etc.

In the quaternary phosphonium salts noted above for use herein, the counter anion of hydroxide or tetraphenyl borate may be replaced with an aryloxy group such as phenoxide, an alkyloxy group such as methoxide or ethoxide, an alkylcarbonyloxy group such as acetate, an arylcarbonyloxy group such as benzoate, or a halogen atom such as chloride or bromide.

(iii) Quaternary Phosphonium Salts having Aryl and/or Branched Alkyl Groups:

Herein usable are compounds of general formulae (15) and (16):

$(R^{11}{}_nPR^{12}{}_{4-n})^+(X^2)^-$ (15)

$(R^{11}{}_nPR^{12}{}_{4-n})^+{}_2(Y^1)^{2-}$ (16).

In formulae (15) and (16);

n represents an integer of from 1 to 4.

$R^{11}$ represents at least one selected from an aryl group and a branched alkyl group. The branched alkyl group has a structure of "$R_3C-$", in which R represents at least one selected from a hydrogen atom, an alkyl group, a substituted alkyl group, an aryl group, and a substituted aryl group, and at least two of the three R's may be bonded to each other to form a cyclic structure. In this, however, two R's must not be hydrogens at the same time. For example, $R^{11}$ is a cycloalkyl group, a branched alkyl group such as an isopropyl or tert-butyl group, or an arylalkyl group such as a benzyl group.

When n is 2 or more, plural R's may be the same or different ones.

$R^{12}$ represents an alkyl group, a substituted alkyl group, an aryl group, or a substituted aryl group.

$X^2$ represents a group capable of forming a mono-valent anion, such as a halogen atom, a hydroxyl group, an alkyloxy group, an aryloxy group, R'COO, $HCO_3$, $(R'O)_2P(=O)$ O, $BR''_4$ or the like. In those, R' represents a hydrocarbon group such as an alkyl group, an aryl group or the like, and two (R'O)s may be the same or different ones. R" represents a hydrogen atom, or a hydrocarbon group such as an alkyl group, an aryl group or the like, and four R"s may be the same or different ones.

$Y^1$ represents a group capable of forming a di-valent anion, such as $CO_3$ or the like.

The quaternary phosphonium salts include, for example, the following:

Tetra(aryl or alkyl)phosphonium hydroxides, such as tetraphenylphosphonium hydroxide, tetranaphthylphosphonium hydroxide, tetra(chlorophenyl)phosphonium hydroxide, tetra (biphenyl)phosphonium hydroxide, tetratolylphosphonium hydroxide, tetrahexylphosphonium hydroxide, etc.;

Mono(aryl or alkyl) triphenylphosphonium hydroxides, such as methyltriphenylphosphonium hydroxide, ethyltriphenylphosphonium hydroxide, propyltriphenylphosphonium hydroxide, butyltriphenylphosphonium hydroxide, octyltriphenylphosphonium hydroxide, tetradecyltriphenylphosphonium hydroxide, benzyltriphenylphosphonium hydroxide, ethoxybenzyltriphenylphosphonium hydroxide, methoxymethyltriphenylphosphonium hydroxide, acetoxymethyltriphenylphosphonium hydroxide, phenacyltriphenylphosphonium hydroxide, chloromethyltriphenylphosphonium hydroxide, bromomethyltriphenylphosphonium hydroxide, biphenyltriphenylphosphonium hydroxide, naphtyltriphenylphosphonium hydroxide, chlorophenyltriphenylphosphonium hydroxide, phenoxyphenyltriphenylphosphonium hydroxide, methoxyphenyltriphenylphosphonium hydroxide, acetoxyphenyltriphenylphosphonium hydroxide, naphtylphenyltriphenylphosphonium hydroxide, etc.;

Mono(aryl)trialkylphosphonium hydroxides, such as phenyltriethylphosphonium hydroxide, biphenyltrimethylphosphonium hydroxide, phenyltrihexylphosphonium hydroxide, biphenyltrihexylphosphonium hydroxide, etc.

Diaryldialkylphosphonium hydroxides, such as dimethyldiphenylphosphonium hydroxide, diethyldiphenylphosphonium hydroxide, di(biphenyl)diphenylphosphonium hydroxide, etc.;

Tetraarylphosphonium tetraphenyl borates, such as tetraphenylphosphonium tetraphenyl borate, tetranaphthylphosphonium tetraphenyl borate, tetra(chlorophenyl)phosphonium tetraphenyl borate, tetra(biphenyl)phosphonium tetraphenyl borate, tetratolylphosphonium tetraphenyl borate, etc.;

Mono (aryl or alkyl) triphenylphosphonium tetraphenyl borates, such as methyltriphenylphosphonium tetraphenyl borate, ethyltriphenylphosphonium tetraphenyl borate, propyltriphenylphosphonium tetraphenyl borate, butyltriphenylphosphonium tetraphenyl borate, octyltriphenylphosphonium tetraphenyl borate, tetradecyltriphenylphosphonium tetraphenyl borate, benzyltriphenylphosphonium tetraphenyl borate, ethoxybenzyltriphenylphosphonium tetraphenyl borate, methoxymethyltriphenylphosphonium tetraphenyl borate, acetoxymethyltriphenylphosphonium tetraphenyl borate, phenacyltriphenylphosphonium tetraphenyl borate, chloromethyltriphenylphosphonium tetraphenyl borate, bromomethyltriphenylphosphonium tetraphenyl borate, biphenyltriphenylphosphonium tetraphenyl borate, naphtyltriphenylphosphonium tetraphenyl borate, chlorophenyltriphenylphosphonium tetraphenyl borate, phenoxyphenyltriphenylphosphonium tetraphenyl borate, acetoxyphenyltriphenylphosphonium tetraphenyl borate, naphthylphenyltriphenylphosphonium tetraphenyl borate, etc.;

Monoaryltrialkylphosphonium tetraphenyl borates, such as phenyltrimethylphosphonium tetraphenyl borate, biphenyltrimethylphosphonium tetraphenyl borate, phenyltrihexylphosphonium tetraphenyl borate, biphenyltrihexylphosphonium tetraphenyl borate, etc.;

Diaryldialkylphosphonium tetraphenyl borates, such as dimethyldiphenylphosphonium tetraphenyl borate, diethyldiphenylphosphonium tetraphenyl borate, di(biphenyl)diphenylphosphonium tetraphenyl borate, etc.

Apart from the compounds of formula (15) noted above, also employable herein are compounds of formula (16) having a di-valent counter anion. As those, for example, mentioned are quaternary phosphonium salts such as bis(tetraphenylphosphonium) carbonate, bis(biphenyltriphenylphosphonium) carbonate, as well as bis-tetraphenylphosphonium salt of 2,2-bis(4-hydroxyphenyl) propane, and ethylenebis(triphenylphosphonium)dibromide, trimethylenebis(triphenylphosphonium)-bis(tetraphenyl borate), etc.

In addition, further employable herein are compounds of general formulae (17) and (18):

$$((R_{13}-Ph)_n-PPh_{(4-n)})^+(X^3)^- \tag{17}$$

$$((R_{13}-Ph)_n-PPh_{(4-n)})_2^+(Y^2)^{2-} \tag{18}$$

wherein $R^{13}$ represents an organic group, and plural $R^{13}$'s, if any, may be the same or different ones; $X^3$ represents a halogen atom, a hydroxyl group, an alkyloxy group, an aryloxy group, an alkylcarbonyloxy group, an arylcarbonyloxy group, $HCO_3$, or $BR_4$ (in which R represents a hydrogen atom or a hydrocarbon group, and four R's may be the same or different ones); Ph represents a phenyl group; $Y^2$ represents $CO_3$; and n represents an integer of from 1 to 4.

Specific examples of those quaternary phosphonium compounds include, for example, tetraphenylphosphonium hydroxide, biphenyltriphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium tetraphenyl borate, biphenyltriphenylphosphonium tetraphenyl borate, methoxyphenyltriphenylphosphonium tetraphenyl borate, phenoxyphenyltriphenylphosphonium tetraphenyl borate, naphthylphenyltriphenylphosphonium tetraphenyl borate, tetraphenylphosphonium phenoxide, biphenyltriphenylphosphonium phenoxide, methoxyphenyltriphenylphosphonium phenoxide, phenoxyphenyltriphenylphosphonium phenoxide, naphthylphenyltriphenylphosphonium phenoxide, tetraphenylphosphonium chloride, biphenyltriphenylphosphonium chloride, methoxyphenyltriphenylphosphonium chloride, phenoxyphenyltriphenylphosphonium chloride, naphthylphenyltriphenylphosphonium chloride, etc.

Specific examples of branched alkyl-having quaternary phosphoniums include isopropyltrimethylphopshonium, isopropyltriethylphosphonium, isopropyltributylphosphonium, isopropyltriphenylphosphonium, tetraisopropylphosphonium, cyclohexyltriethylphosphonium, cyclohexyltrimethylphosphonium, cyclohexyltributylphosphonium, cyclohexyltriphenylphosphonium, tetracyclohexylphosphonium, 1,1,1-triphenylmethyltrimethylphosphonium, 1,1,1-triphenylmethyltriethylphosphonium, 1,1,1-triphenylmethyltributylphosphonium, 1,1,1-triphenylmethyltriphenylphosphonium, etc.

Specific examples of counter anions for $X^3$ include hydroxide, borohydride, tetraphenyl borate, acetate, propionate, fluoride, chloride, hydrocarbonate, etc.

One example of $Y^2$ is carbonate.

As specific examples of salts composed of a branched alkyl-having quaternary phosphonium (cation) and $X^3$ or $Y^2$ (anion), mentioned are various combinations of the specific examples for cations and anions noted above. For those, specifically mentioned are isopropyltrimethylphosphonium hydroxide, cyclohexyltriphenylphosphonium chloride, 1,1,1-triphenylmethyltriethylphosphonium acetate, bis(isopropyltriethylphosphonium) carbonate, etc.

Of those branched alkyl-having quaternary phosphonium salts, especially preferred are cyclohexyltriphenylphosphonium tetraphenyl borate and cyclopentyltriphenylphosphonium tetraphenyl borate, since their catalytic activity and the quality of polycarbonates to be produced are well balanced.

It is desirable that the amount of metallic impurities in the phosphorus-containing basic compounds and the quaternary phosphonium salts for use in the invention is as small as possible. Especially preferably, the amount of alkali metal and alkaline earth metal compounds in those compounds is not larger than 50 ppm.

[2] Solid-phase Polymerization:

The solid prepolymer prepared previously, which is preferably crystallized, is further polymerized. The polymerization must be effected in a poor solvent gas atmosphere.

(i) The poor solvent is meant to indicate that the solubility of the product, polycarbonate in it is at most 0.1% by weight. Concretely, it includes linear aliphatic, branched aliphatic or cycloaliphatic hydrocarbons having from 4 to 18 carbon atoms, such as pentane, hexane, heptane, cyclohexane, etc.; ketones suchas acetone, cyclohexanone, etc.; ethers such as dioxane, tetrahydrofuran, etc.; acetonitrile, etc. Of those, preferred are linear aliphatic or cycloaliphatic hydrocarbons having from 5 to 18 carbon atoms, such as pentane, hexane, heptane, cyclohexane, etc. "In a poor solvent gas atmosphere" as referred to herein is meant to indicate that the polymerization is effected in the presence of apoor solvent gas such as that mentioned above. Preferably, the poor solvent gas is flowing in some degree through the reaction system. In the poor solvent gas atmosphere, the side products, aromatic monohydroxy compound and diaryl carbonate are easy to remove from the reaction system, and the reaction is accelerated to give polycarbonates having an increased molecular weight.

(ii) The shape of the crystalline prepolymer to be subjected to the solid-phase polymerization is not specifically defined, but the prepolymer is preferably in the form of pellets, beads or the like.

The catalyst for the solid-phase polymerization is a phosphorus-containing basic compound. When the catalyst used in the prepolymerization step is a phosphorus-containing basic catalyst and when it remains in the system, the compound could serve as the catalyst for the solid-phase polymerization. If necessary, an additional phosphorus-containing basic compound serving as the catalyst may be added to the system, and it may be powdery, liquid or gaseous.

The amount of the catalyst is so controlled that it may be generally from $10^{-8}$ to $10^{-1}$ mols, preferably from $10^{-7}$ to $10^{-2}$ mols, more preferably from $10^{-6}$ to $10^{-3}$ mols, relative to one mol of the starting dihydroxy compound of the component (A). If its amount is smaller than $10^{-8}$ mols, the catalyst could not exhibit its activity. However, if larger than $10^{-1}$ mols, the physical properties of the final product, polycarbonate, especially the heat resistance and the hydrolysis resistance thereof will be degraded, and, in addition, the production costs will increase. Adding the catalyst over the defined range is meaningless.

The polymerization temperature Tp (° C.) and the polymerization time may vary, depending on various conditions. Preferably, however, the prepolymer is heated at a temperature which is not lower than the glass transition point of the intended aromatic polycarbonate and at which the crystalline prepolymer being in solid-phase polymerization is not melted but still keeps its solid-phase state, for a period of time falling between 1 minute and 100 hours.

Without being cooled, the thus-obtained, powdery, crystalline aromatic polycarbonates may be directly introduced into extruders for pelletizing them, or into shaping machines for shaping them.

[3] In the solid-phase polymerization in the invention, optionally used is a terminal-stopping agent, preferably p-t-butylphenol, p-cumylphenol, p-phenylphenol or the like. Further if desired, a known branching agent may also be used. Still if necessary, a known antioxidant may be added to the reaction system. As the antioxidant, preferred are phosphorus-containing antioxidants.

[4] Oxygen Concentration and Water Concentration in Vapor Phase in Polymerization System:

In the invention, it is desirable that the oxygen concentration in the vapor phase in the polymerization reaction system is not larger than 2 ppm. It is also desirable that the water concentration in the reaction system is not larger than 2 ppm. The method for lowering the oxygen concentration in the reaction system to be not larger than 2 ppm and for lowering the water concentration therein also to be not larger than 2 ppm is not specifically defined. For example, an oxygen-removing duct equipped with an oxygen filter or the like and a water-removing duct equipped with a moisture filter or the like may be disposed before the polymerization reactor in the production line.

(4) If desired, the polycarbonates as obtained according to the invention may be mixed with any known additives of, for example, plasticizers, pigments, lubricating agents, mold-releasing agents, stabilizers, inorganic fillers, etc., before they are used. Further if desired, the polycarbonates may be blended with any other polymers, such as polyolefins, polystyrenes, polyesters, polysulfonates, polyamides, polyphenylene ethers, etc. In particular, they are effectively blended with any of polyphenylene ethers, polyether nitrites, terminal-modified polysiloxane compounds, modified polypropylenes, modified polystyrenes and the like having OH, COOH, $NH_2$ or the like group at their terminals.

EXAMPLES

The invention will be described in more detail with reference to the following Examples and Comparative Examples, which, however, are not intended to restrict the scope of the invention.

In Table 1 below, the viscosity-average molecular weight Mv is obtained according to the following equation, in which $[\eta]$ indicates the limiting viscosity in methylene chloride at 20° C.

$$[\eta]=1.23\times10^{-5}\times Mv^{0.83}$$

In the steam resistance test for polycarbonates, the polycondensate sample to be tested is press-molded into test discs having a thickness of 1 mm and a diameter of 10 mm, which are then exposed to steam at 121° C. for 48 hours. The decrease in the viscosity-average molecular weight ($\Delta Mv$) of the exposed sample is obtained, from which the steam resistance of the sample is evaluated.

EXAMPLES 1 TO 7

228 g (1 mol) of bisphenol A (BPA), 225 g (1.05 mols) of diphenyl carbonate (DPC) and 0.5 mmols of tetramethylammonium hydroxide (TMAH) were put into a one-liter nickel-steel autoclave equipped with a stirrer, and purged with argon five times in all. Next, the mixture was heated at 190° C. and reacted for 30 minutes in the argon atmosphere. Next, this was gradually heated up to 235° C. and reacted for 60 minutes with being vacuumed up to a vacuum degree of 60 mmHg; then this was further heated gradually up to 270° C. and reacted for 120 minutes with being vacuumed up to a vacuum degree of 10 mmHg; then this was still further reacted at that temperature for 30 minutes with being vacuumed up to a vacuum degree of 1 mmHg; and finally, this was still further reacted at that temperature for 30 minutes with being vacuumed up to a vacuum degree of 0.5 mmHg. After the reaction, the reactor was restored with argon to have an atmospheric pressure, and the product, prepolymer formed therein was taken out, and ground.

The prepolymer had a viscosity-average molecular weight of 8800, and its terminal hydroxyl fraction was 50%. Its melting point measured through DSC was 226° C.

The thus-obtained prepolymer was dissolved in methylene chloride, to which was added cyclohexyltriphenylphosphonium tetraphenyl borate (HPTB) in an amount of $1 \times 10^{-5}$ mol/mol-BPA. Next, n-heptane was added thereto to give a powdery deposit. This was concentrated and dried up to solid, and the solid was further dried in vacuum to obtain a powdery prepolymer.

1.0 g of the powdery prepolymer was charged into a SUS tube having a diameter of 10 mm and a length of 200 mm, and the gas shown in Table 1 was introduced thereinto at a flow rate of 100 ml/min at 230° C. In that condition, the prepolymer was polymerized in a solid phase for 90 minutes to obtain a polycarbonate. The data are shown in Table 1.

Comparative Example 1

The prepolymer having been prepared in the same manner as in Example 1 was polymerized in a solid phase also in the same manner as in Example 1, except that paraxylene was used herein as the solvent gas. The data are shown in Table 1. In this, the polycarbonate produced after polymerization partly fused.

EXAMPLES 8 TO 14

22.8 g (0.1 mol) of bisphenol A (BPA), 22.5 g (0.105 mols) of diphenyl carbonate (DPC), 0.05 mmols of tetramethylammonium hydroxide (TMAH) and 0.001 mmols of tetraphenylphosphonium tetraphenyl borate (TPTB) were put into a separable 100-liter nickel flask equipped with a stirrer, and purged with argon five times in all. Next, the mixture was heated at 190° C. and reacted for 30 minutes in the argon atmosphere. Next, this was gradually heated up to 235° C. and reacted for 60 minutes with being vacuumed up to a vacuum degree of 60 mmHg; then this was further heated gradually up to 270° C. and reacted for 120 minutes with being vacuumed up to a vacuum degree of 10 mmHg; then this was still further reacted at that temperature for 30 minutes with being vacuumed up to a vacuum degree of 1 mmHg; and finally, this was still further reacted at that temperature for 30 minutes with being vacuumed up to a vacuum degree of 0.5 mmHg. After the reaction, the reactor was restored with argon to have an atmospheric pressure, and the product, prepolymer formed therein was taken out, and ground.

The prepolymer had a viscosity-average molecular weight of 8300, and its terminal hydroxyl fraction was 50%. Its melting point measured through DSC was 226° C.

The thus-obtained prepolymer was dissolved in methylene chloride, to which was added n-heptane was to give a powdery deposit. This was concentrated and dried up to solid, and the solid was further dried in vacuum to obtain a powdery prepolymer. 0.2 g of the powdery prepolymer was charged into a SUS tube having a diameter of 10 mm and a length of 200 mm, and the gas shown in Table 1 was introduced thereinto at a flow rate of 100 ml/min at 90 ° C. In that condition, the prepolymer was polymerized in a solid phase for 90 minutes to obtain a polycarbonate.

The data are shown in Table 1.

Comparative Example 2

The prepolymer having been prepared in the same manner as in Example 8 was polymerized in a solid phase in the same manner as in Example 1, except that paraxylene was used herein as the solvent gas. The data are shown in Table 1. In this, the polycarbonate produced after polymerization partly fused.

Comparative Example 3

The prepolymer having been prepared in the same manner as in Example 1 was polymerized in a solid phase in the same manner as in Example 1, except that $1 \times 10^{-4}$ mol/mol-BPA of triethylamine was used as the solvent herein in place of $1 \times 10^{-5}$ mol/mol-BPA of cyclohexyltriphenylphosphonium tetraphenyl borate (HPTB).

The data are shown in Table 1.

Comparative Example 4

The prepolymer having been prepared in the same manner as in Example 1 was polymerized in a solid phase in the same manner as in Example 1, except that $1 \times 10^{-4}$ mol/mol-BPA of 4-dimethylaminopyridine was used as the solvent herein in place of $1 \times 10^{-5}$ mol/mol-BPA of cyclohexyltriphenylphosphonium tetraphenyl borate (HPTB).

The data are shown in Table 1.

TABLE 1

|  | Catalyst Compound | Poor Solvent Compound | Viscosity-Average Molecular Weight (Mv) | Steam Resistance Test (ΔMv) |
| --- | --- | --- | --- | --- |
| Example 1 | HPTB | pentane | 39,400 | 100 |
| Example 2 | HPTB | hexane | 35,900 | 100 |
| Example 3 | HPTB | cyclohexane | 40,100 | 100 |
| Example 4 | HPTB | heptane | 36,700 | 100 |
| Example 5 | HPTB | octane | 33,100 | 200 |
| Example 6 | HPTB | decane | 38,300 | 200 |
| Example 7 | HPTB | undecane | 27,700 | 200 |
| Example 8 | TPTB | pentane | 30,400 | 200 |

TABLE 1-continued

|  | Catalyst Compound | Poor Solvent Compound | Viscosity-Average Molecular Weight (Mv) | Steam Resistance Test (ΔMv) |
|---|---|---|---|---|
| Example 9 | TPTB | hexane | 27,800 | 200 |
| Example 10 | TPTB | cyclohexane | 29,700 | 200 |
| Example 11 | TPTB | heptane | 30,400 | 100 |
| Example 12 | TPTB | octane | 25,100 | 200 |
| Example 13 | TPTB | decane | 22,900 | 200 |
| Example 14 | TPTB | undecane | 18,600 | 200 |
| Comparative Example 1 | HPTB | paraxylene | 15,800 | 200 |
| Comparative Example 2 | TPTB | paraxylene | 13,100 | 300 |
| Comparative Example 3 | trimethyl-amine | pentane | 8,330 | — |
| Comparative Example 4 | 4-dimethyl-amino-pyridine | pentane | 9,730 | — | notes
HPTB: cyclohexyltriphenylphosphonium tetraphenyl borate
TPTB: tetraphenylphosphonium tetraphenyl borate

INDUSTRIAL APPLICABILITY

According to the invention, efficiently produced are high-quality polycarbonates having a high molecular weight.

What is claimed is:

1. A process for producing a polycarbonate, which comprises preparing a polycarbonate prepolymer through pre-polymerization followed by polymerizing the prepolymer in a solid phase in the presence of a phosphorus-containing basic compound serving as a catalyst in an atmosphere of a poor solvent gas selected from the group consisting of a linear aliphatic hydrocarbon having from 5 to 18 carbon atoms and cycloaliphatic hydrocarbon having from 5 to 18 carbon atoms.

2. The process for producing a polycarbonate as claimed in claims 1, wherein the phosphorus-containing basic compound is a quaternary phosphonium salt.

* * * * *